A. E. BATES.
DESK CALENDAR.
APPLICATION FILED OCT. 3, 1912.
1,083,913.
Patented Jan. 13, 1914.
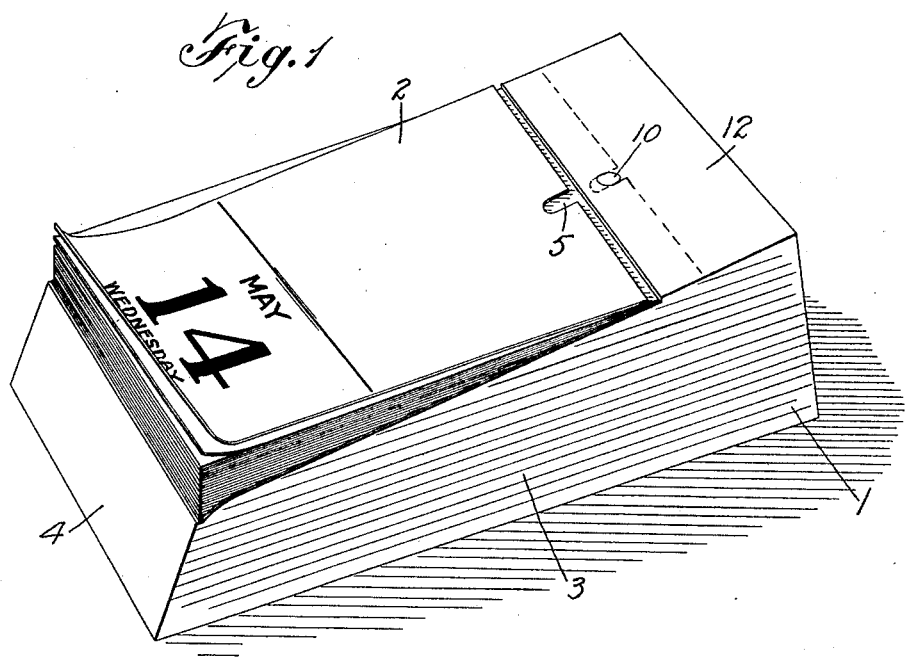
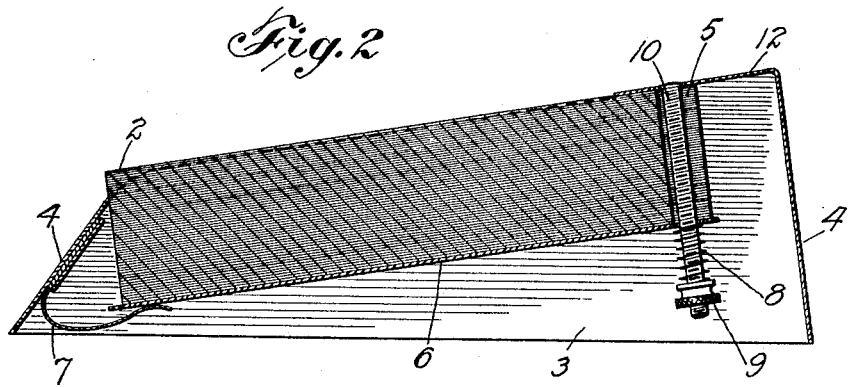
Witnesses
Frank H. Vick Jr.
John W. Peters
Inventor
Albert E. Bates
by Sheffield Bentley & Betts
his Attorneys

UNITED STATES PATENT OFFICE.

ALBERT E. BATES, OF NYACK, NEW YORK.

DESK-CALENDAR.

1,083,913. Specification of Letters Patent. Patented Jan. 13, 1914.

Application filed October 3, 1912. Serial No. 723,693.

*To all whom it may concern:*

Be it known that I, ALBERT E. BATES, a citizen of Canada, residing in the city of Nyack, Rockland county, State of New York, have invented or discovered certain new and useful Improvements in Desk-Calendars, of which the following is a full, clear, and complete description.

My invention more particularly relates to calendars comprising pads having the days, months, etc., indicated on the separate leaves thereof in rotation with bases or frames for holding the pads in position.

The object of my invention is to provide a calendar of this kind which will be simple, cheap to construct, and in which the leaves, while being severally held against accidental displacement, yet may be easily withdrawn one at a time by the user.

A further object of my invention is to so construct the device that the pad will be to a large extent protected from dirt and dust.

A still further object is to so construct the device that the frame while serving to hold the pad may also be conveniently used for advertising and display purposes.

In the drawing accompanying and forming a part of this specification I have illustrated the preferred embodiment of my invention.

Figure 1 is a perspective view of the device with the pad in position, the top leaf of the pad being partly withdrawn. Fig. 2 is a longitudinal section view showing the adjustable means for supporting the pad.

In this drawing the numeral 1 indicates the base or frame for holding the pad 2. The base has side walls 3, end walls 4, and a top member 12, of sheet metal or other suitable material. The pad 2 consists of separate leaves each designating one day of the year and these are arranged in rotation in the usual way. The leaves are notched at their upper ends at 5 and the pad is disposed within the base with its upper end beneath the top member 12. A plate 6 is provided as a support for the pad and this plate is pressed upwardly at one end by a spring 7 fixed to the front wall of the device and at the other end by a spring 8. The spring 8 rests at its lower end on the nut 9 mounted on the rod 10 fixed at its upper end to the top member 12. The rod passes through the notches in the ends of the leaves. The tension of the spring 8 can be adjusted when desired by means of the nut 9. The function of the springs 7 and 8 is to press the pad upwardly as leaves are withdrawn, so as to keep the top of the pad substantially flush with the top of the frame, as shown in the drawings. When the separate leaves are withdrawn one at a time they slide out from under the member 12 and it is not necessary to tear the leaves as has heretofore been customary. In Fig. 1 the top leaf is shown partly withdrawn.

The pad as a whole is protected by the walls of the base and is not so liable to accumulate dirt and dust as when mounted on the top of a base as has heretofore been customary.

The front wall 4 and the top member 12 may be used for displaying advertising matter if desired.

It will be noted that the top of the housing formed by the side and end walls is unobstructed except by the strip 12 at the rear end of the device. It will also be noted that the front wall 4 is cut down or made lower than the rear wall and that the top edges of the side walls adjacent the front wall 4 also slope downwardly. The arrangement is such that the top of the pad, excepting the small portion covered by the strip 12 and a portion of the front end of the pad are exposed so that the leaves may be easily raised and folded back by the user for the purpose of noting future engagements, etc.

Having described my invention, what I claim is:

A calendar of the kind described, comprising a housing having side and end walls, the top of the housing being open and unobstructed at its forward end, a calendar pad located in said housing with its top and front end in part exposed so that the leaves may be folded back, and a plate arranged to support said pad in substantially a horizontal position and extending over substantially the entire lower surface of said pad, there being means for manual adjustment of the plate as to height from time to time, substantially as described.

ALBERT E. BATES.

Witnesses:
WALTER S. JONES,
MARGARET MACINTYRE.

Copies of this patent may be obtained for five cents each, by addressing the "Commissioner of Patents, Washington, D. C."